(12) United States Patent
Dias et al.

(10) Patent No.: US 8,155,167 B2
(45) Date of Patent: Apr. 10, 2012

(54) LOW COMPLEXITY FREQUENCY HOPPING SOLUTION FOR PERFORMANCE TESTING SYSTEM AND METHOD

(75) Inventors: Alexandre Ribeiro Dias, Toulouse (FR); Eric Marlot, Tournefeuille (FR)

(73) Assignee: Motorola Mobility, Inc., Libertyville, IL (US)

( * ) Notice: Subject to any disclaimer, the term of this patent is extended or adjusted under 35 U.S.C. 154(b) by 1378 days.

(21) Appl. No.: 11/743,215

(22) Filed: May 2, 2007

(65) Prior Publication Data

US 2008/0019421 A1 Jan. 24, 2008

(30) Foreign Application Priority Data

Jul. 21, 2006 (EP) .................................... 06300824

(51) Int. Cl.
*H04B 1/69* (2011.01)
*H04B 1/707* (2011.01)

(52) U.S. Cl. .................. 375/132; 375/138; 375/140

(58) Field of Classification Search ................ 375/132, 375/130, 144; 703/13
See application file for complete search history.

(56) References Cited

U.S. PATENT DOCUMENTS

| | | | | | |
|---|---|---|---|---|---|
| 3,689,844 | A | * | 9/1972 | Buzzard et al. | 375/328 |
| 4,105,958 | A | * | 8/1978 | Pierce et al. | 333/166 |
| 4,646,173 | A | * | 2/1987 | Kammeyer et al. | 360/51 |
| 5,794,128 | A | * | 8/1998 | Brockel et al. | 455/67.11 |
| 5,940,429 | A | * | 8/1999 | Lam et al. | 375/130 |
| 6,052,407 | A | * | 4/2000 | Ciccone et al. | 375/133 |
| 6,600,926 | B1 | * | 7/2003 | Widell et al. | 455/446 |
| 6,993,464 | B2 | * | 1/2006 | Chiu et al. | 703/2 |
| 7,010,060 | B2 | * | 3/2006 | Ledvina et al. | 375/316 |
| 7,013,257 | B1 | * | 3/2006 | Nolan et al. | 703/28 |
| 7,158,770 | B2 | * | 1/2007 | Hanaoka et al. | 455/226.1 |
| 7,336,694 | B2 | * | 2/2008 | Ghosh | 375/130 |
| 7,542,764 | B2 | * | 6/2009 | Jin et al. | 455/425 |
| 2003/0236089 | A1 | | 12/2003 | Beyme et al. | |
| 2006/0140251 | A1 | * | 6/2006 | Brown et al. | 375/135 |
| 2006/0227856 | A1 | * | 10/2006 | Ledvina et al. | 375/150 |
| 2007/0053415 | A1 | * | 3/2007 | Sayers | 375/142 |
| 2007/0243839 | A1 | * | 10/2007 | Kostic | 455/132 |

FOREIGN PATENT DOCUMENTS

| | | |
|---|---|---|
| WO | 93/20626 A1 | 10/1993 |
| WO | 03069814 A2 | 8/2003 |

OTHER PUBLICATIONS

J. Heinanen, J. Auer, T. Jamsa, T. Poutanen, J. Talvitie, H. Hakalahti, "Multipath fading simulation for design verification in digital baseband domain", International Conference on 3G Mobile Communication Technologies, No. 471, 2000, pp. 376-380 XP002970673.

* cited by examiner

*Primary Examiner* — Khanh C Tran
*Assistant Examiner* — Qutbuddin Ghulamali
(74) *Attorney, Agent, or Firm* — Elahe Toosi, Ingrassia, Fisher & Lorenz, P.C.; Sylvia Chen

(57) ABSTRACT

A system and method for low complexity frequency hopping simulation for communication device performance testing is disclosed. A baseband and channel model combination in a baseband processing module (602) of a testing system (600) reduces the required number of computations while retaining accuracy. A simulated channel is generated (612) with a bandwidth required for frequency hopping, and the hopping is simulated by shifting (614) the channel (612) instead of the signal (606). Signal attenuation by the shifted channel (615) is modeled in the baseband processing module (602), and the resulting simulated signal (610) is then up-sampled (628) to the proper frequency for output to the test device (634).

12 Claims, 3 Drawing Sheets

LOW COMPLEXITY FREQUENCY HOPPING SOLUTION FOR PERFORMANCE TESTING SYSTEM AND METHOD

TECHNICAL FIELD

Embodiments of the present invention relate generally to communication system simulation and testing, and more particularly to frequency hopping spread spectrum communication system simulation and testing.

BACKGROUND

Testing environments for mobile phones and other communication devices may require large numbers of expensive apparatus. Among many other testing apparatus, radio frequency (RF) carrier elevation and RF channel simulation are particularly complex and expensive due to their bandwidth, high frequency, and data rate requirements. Among these apparatus, the RF channel simulator is usually the most expensive since it has a very large bandwidth and strong noise constraints.

Additional requirements and constraints are related to the details of the communication system under test. For example, a frequency hopping spread spectrum communication system changes its signal transmission frequency within its transmission frequency band at regular time intervals. The changes in signal transmission frequency are done according to a pseudo random pattern called a "hopping" pattern. For example, a BLUETOOTH™ wireless network uses 79 frequencies, and in basic operation hops between frequencies every 625 microseconds, which is equivalent to 1600 hops per second.

FIG. 1 represents the relation 100 between frequency hopping, the frequency band, and the channel. Channel profile 102 represents the level of attenuation at a given frequency within the channel frequency band. In other words, channel profile 102 indicates the frequency response of the channel. The channel profile 102 simulates the properties of the transmission medium that may attenuate signal transmission. For wireless transmission, the channel profile 102 is a simulation model of air, rain, water vapor, buildings, interference, and other channel properties. A transmission medium may have fixed or varying properties, so a channel profile may have a fixed or varying attenuation over time. Fixed or varying attenuation over time is also known as "fading", and a simulation model with fading is known as a "fading model". Examples of fading models are the Ricean, Rayleigh, or Gaussian fading models, which can be found, for example, in Typical Urban (TU), Hilly Terrain (HT), Rural Area (RA), Equalizer Test (EQ) in the Global System for Mobile Communications (GSM) specifications: 3GPP-TS-05.05—$3^{rd}$ Generation Partnership Project, Technical Specification Group GSM/EDGE, Radio Access Network, Radio Transmission and Reception.

Signal band 104 represents the band of a signal centered at a frequency 106 offset by "f0" 107 from the carrier frequency 108 before signal frequency hopping. Signal band 110 represents the band of the signal centered at a new frequency 112 offset by "f1" 109 from the carrier frequency 108 after signal frequency hopping. After the signal frequency hopping takes place, the attenuation of the signal band 110 changes due to the new frequency location of signal band 110 relative to the channel profile 102. The signal is heavily attenuated at frequency offset "f0" 107 relative to the attenuation at frequency offset "f1" 109. By using signal processing such as interleaving and error control coding, signals transmitted at frequencies 106 and 112 can be combined to produce a consistent data rate despite the different attenuation.

Because a wireless channel is usually in constant flux due to interference and motion, it is difficult to predict the location or locations of deep attenuation in the channel band. By using a signal that hops over many frequency offsets throughout the channel band along with signal processing, a consistent data transmission is possible. This is known as frequency diversity. For accuracy, a channel simulation must calculate the frequency attenuation of the channel profile at each hop frequency and at each simulated time interval, which is very computation intensive. Consequently, such simulations typically require equipment with high computational capabilities.

An example of a typical simulation and testing apparatus 200 including an RF channel simulator is depicted in FIG. 2 where baseband processing module 202 performs conventional baseband signal processing such as channel formatting, segmentation, interleaving, error correction coding, D/A conversion, etc. RF carrier elevation and hopping module 204 performs the frequency up conversion and signal frequency hopping. The RF channel simulator module 206 performs the simulation of the channel model. The downlink 208 represents the simulated signal converted into an actual RF radio signal (the details of the conversion are omitted for clarity), and fed to the test device 210. The test device 210 responds by generating and transmitting an uplink signal 212 back to the test apparatus. A conversion-to-baseband module 214 in the test apparatus converts the uplink actual RF radio signal into a digital signal, and then to baseband frequency for analysis.

A known alternative 300 to the typical simulation and testing apparatus depicted in FIG. 2 is to perform channel simulation together with the baseband processing module 302 as shown in FIG. 3, where the baseband processing module 302 performs conventional baseband signal processing such as channel formatting, segmentation, interleaving, error correction coding, D/A conversion, etc. In addition, the baseband processing module 302 also performs signal frequency hopping and full frequency band channel simulation. The RF carrier elevation module 304 performs frequency up conversion. The downlink 306 represents the simulated signal converted into an actual RF radio signal (the details of the conversion are omitted for clarity), and fed to the test device 308. The test device 308 responds by generating and transmitting an uplink signal 310 back to the test apparatus. Conversion to baseband module 312 in the test apparatus converts the uplink actual RF radio signal into a digital signal, and then to baseband frequency for analysis.

A limiting factor for the alternative depicted in FIG. 3 comes from the signal frequency hopping that must be performed before the full frequency band channel simulation in the baseband processing module 302. The bandwidth required at the baseband side for the channel simulation is determined by the full frequency bandwidth on which the generated signals hop, which is higher than the bandwidth of the signals generated, requiring a non-negligible increase in data rate and complexity, which results in a cost increase. Although usually less expensive than an RF channel simulator, this alternative increases the complexity of the baseband processing 302 and requires a more complex baseband and consequently an additional cost increase.

Another known test apparatus uses RF frequency hopping and baseband channel simulation but approximates the simulation of channel fading. The approximation uses an independent fading channel simulation for each hopping frequency in the hopping frequency set. The consequence is that all fading channels are computed and updated in parallel to account for time variation of the fading channels which adds complexity and, therefore, is computationally expensive. Because of the complexity, this solution is limited to a small number of hopping frequencies (e.g., only four), so it is not adapted to a more realistic scenario such as testing 10 target frequencies and time varying channel fading. Furthermore, the channel fading is not accurately simulated because the separately modeled fading channels do not accurately model the statistical properties of the full channel model such as the coherence bandwidth.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

A system and method for low complexity frequency hopping simulation for device performance testing is disclosed. As will be explained in detail in the paragraphs below, a new baseband and channel model combination reduces the required number of operations while retaining accuracy. A channel profile is generated with a bandwidth required for frequency hopping, and the frequency diversity introduced by hopping is simulated by shifting the channel instead of the signal.

Embodiments of the invention are described herein in the context of one practical application, namely, performance testing a mobile device such as a mobile phone. In this context, the example technique is applicable to provide baseband and channel model simulation. Embodiments of the invention, however, are not limited to mobile phones, and the techniques described herein may also be utilized for other forms of signal simulation.

Figure 4:
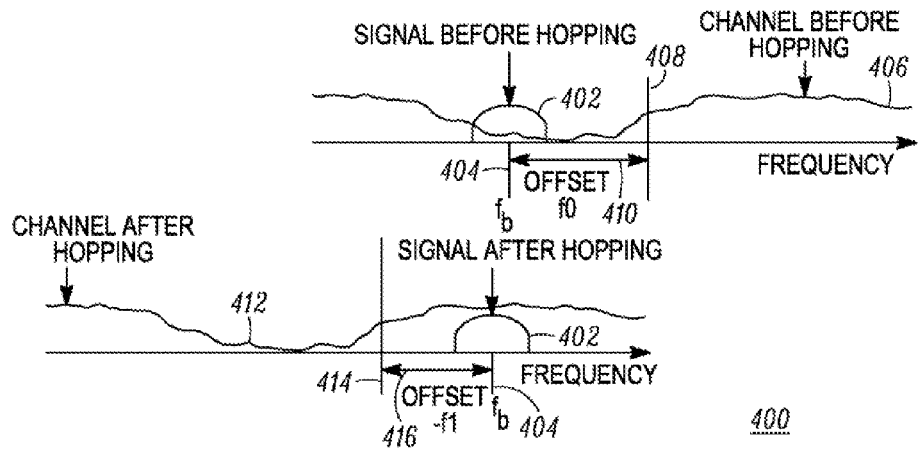
FIG. 4 is a diagram illustrating a stationary signal frequency with channel hopping.

FIG. 4 is a diagram 400 illustrating a stationary signal frequency with channel frequency hopping. Signal band 402 represents the band of the signal centered at the baseband frequency "fb" 404 which may be, without limitation, 0 Hz. The signal band 402 before frequency hopping and the signal band 402 after frequency hopping remain centered at the same frequency 404. The channel profile before hopping 406 represents the level of attenuation at a frequency offset from the baseband before hopping. The channel after hopping 412 represents the level of attenuation at a new frequency offset from the baseband after hopping. After the hopping of the channel, the attenuation within the signal band 402 frequencies changes due to the "shifted" nature of the channel.

Figure 1:
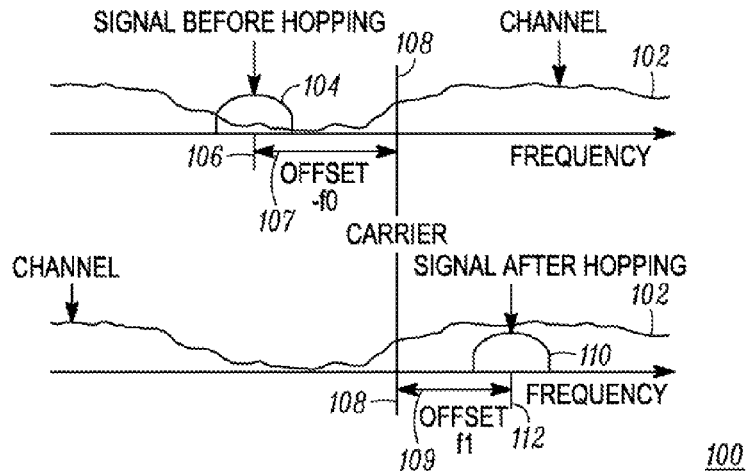
FIG. 1 is a diagram illustrating frequency hopping and a channel profile.
Figure 2:
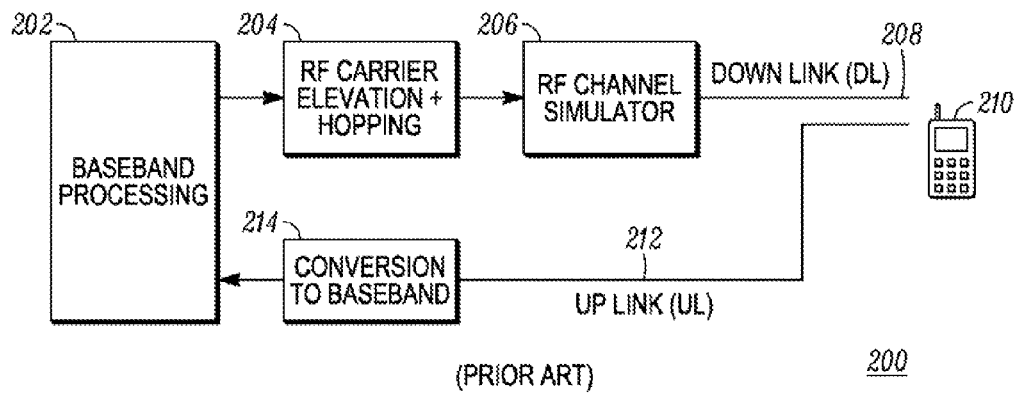
FIG. 2 is a schematic representation of a general set-up for mobile phone performance testing, with an RF channel simulator.
Figure 3:
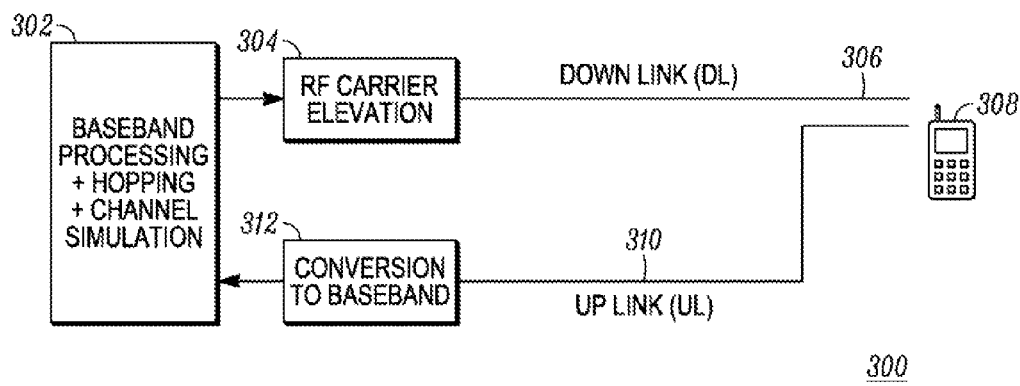
FIG. 3 is a schematic representation of a general set-up for mobile phone performance testing, with baseband hopping and baseband channel simulation.

FIG. 4 can be contrasted with the conventional approach depicted in FIG. 1 where the signal hops. The signal band 402 before frequency hopping represents the same signal band as signal band 104 centered at a frequency 106 offset by "f0" 107 from the carrier frequency 108 before hopping. For FIG. 4, the signal band 402 has the same bandwidth and other characteristics except the center frequency is the baseband frequency "fb" 404 which may be, without limitation, 0 Hz. Also, the center 408 of the frequency band of the channel profile before hopping 406 is frequency shifted by a frequency offset "f0" 410 from the baseband frequency "fb" 404. The frequency offset "f0" 410 is the inverse of the frequency offset "−f0" 107 because the offset is to a higher frequency instead of a lower frequency or vice versa. The channel attenuation 406 at signal band 402 before channel frequency hopping is the same as channel attenuation 102 at signal band 104 before signal frequency hopping.

Also different from FIG. 1, in FIG. 4 rather than having the signal band 402 frequency hop with a carrier offset of "f1" 109, the channel 412 frequency hops with a baseband offset of "−f1" 416 from the baseband frequency "fb" 404. The center 414 of the frequency band of the channel profile after hopping 412 is frequency shifted by a frequency offset "−f1" 416 from the baseband frequency "fb" 404. The frequency offset "−f1" 416 is the inverse of the frequency offset "f1" 109 because the offset is to a lower frequency instead of a higher frequency or vice versa. The signal band 402 after frequency hopping represents the same signal band as signal band 110 centered at a frequency 112 offset by "f1" 109 from the carrier frequency 108 before hopping. For FIG. 4, the signal band 402 does not hop, and has the same bandwidth and other characteristics of signal band 110 except the center frequency is the baseband frequency "fb" 404 instead of frequency 112. The channel attenuation 412 at signal band 402 after channel frequency hopping is the same as channel attenuation 102 at signal band 110 after signal frequency hopping.

While the attenuation is the same for signal bands 110 and 402, the signal band 402 remains centered at baseband frequency "fb" 404 during hopping whereas signal band 104 is centered at frequency 106 before hopping, and after hopping the signal band 110 is centered at frequency 112. According to an example embodiment of the invention, an attenuated signal at baseband frequency "fb" 404 may be up-converted (elevated) to frequency 106 before hopping, which is the carrier frequency 108 plus offset "−f0" 107, or up-converted (elevated) to frequency 112 after hopping, which is the carrier frequency 108 plus offset "f1" 109. The resulting signals would then have the same attenuation and frequency corresponding to the signals resulting from channel attenuation of signal bands 104 or 110 respectively.

Figure 5:
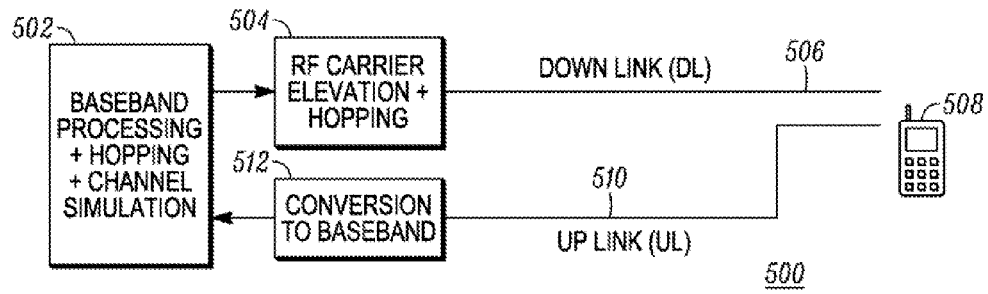
FIG. 5 is a schematic representation of a general set-up for mobile phone performance testing, with hopped channel simulation according to an example embodiment of this invention.

FIG. 5 is a schematic representation of a system 500 that is suitably configured to perform a low complexity frequency hopping simulation for communication device performance testing according to an embodiment of the invention. The system 500 generally includes test equipment or a test apparatus that includes a baseband processing module 502, an RF carrier elevation and hopping module 504, and a conversion-to-baseband module 512. The baseband processing module 502 performs any suitable conventional channel formatting, segmentation, interleaving, error correction coding, D/A conversion, etc. In addition, the baseband processing module 502 also performs frequency hopped channel simulation in this embodiment. The RF carrier elevation and hopping module 504 performs frequency up-conversion to the carrier plus hopping offset frequencies. The downlink 506 represents the simulated signals that are converted into an actual RF radio signal (the details of the conversion are omitted for clarity), and fed to the test device 508. The test device 508 responds by generating and transmitting an uplink signal 510 back to the test apparatus. Conversion-to-baseband module 512 in the test apparatus converts the uplink actual RF radio signal into a digital signal, and then to baseband frequency for analysis. The functional details of system 500 are described in detail below with FIG. 6.

The test apparatus 500 described herein splits the hopping function between the baseband processing module 502 and the RF carrier elevation and hopping module 504, leading to a relatively low complexity and low cost solution for mobile phone performance assessment in the presence of frequency hopping. In FIG. 4, rather than having the signal band 402 frequency hop to a carrier offset of "f1" 109 as in FIG. 1, the channel profile 406 frequency hops with a center 414 frequency offset "−f1" 416 from the baseband frequency "fb" 404. This part of the frequency hopping simulation is performed in the baseband processing module 502, which shifts the channel profile. This process can also be known as "pre-compensated" because the signal is modified (compensated) before a computation. Also in FIG. 4, the signal band 402 is centered at baseband frequency 404 whereas signal band 110 is centered at frequency 112, and an attenuated signal at frequency 404 may be up-converted to frequency 112, which is the carrier frequency 108 plus offset "f1" 109. This part of the frequency hopping simulation is performed in the RF carrier elevation and hopping module 504, which shifts the signal to the proper RF frequency. Thus, the hopping function is split between the baseband processing module 502 and the RF carrier elevation and hopping module 504.

Figure 6:
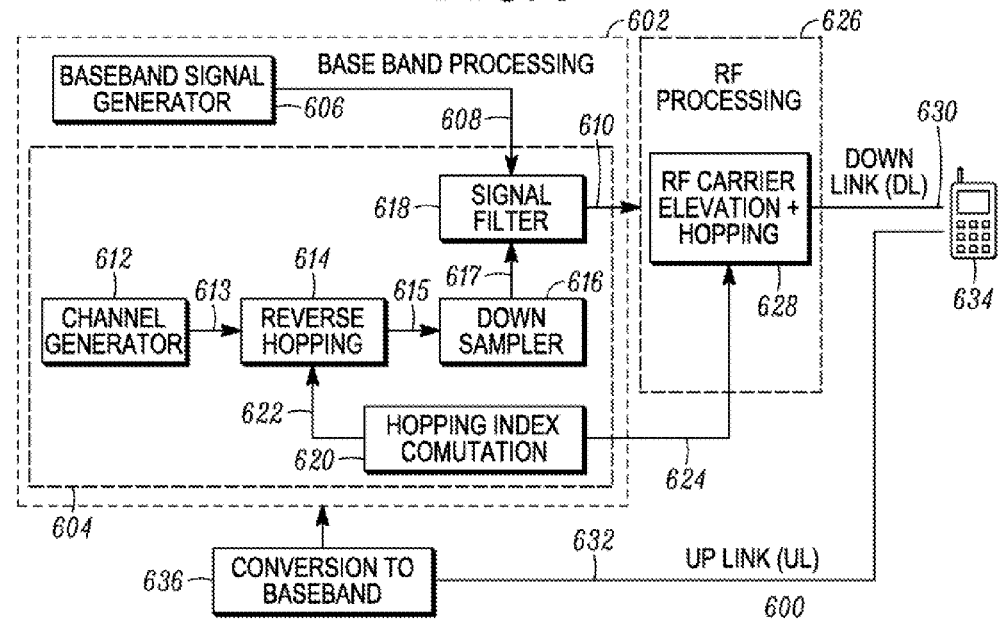
FIG. 6 is a schematic representation of downlink baseband processing with hopped channel simulation according to an example embodiment of this invention.

FIG. 6 is a schematic representation of a simulation system or test apparatus 600 for device testing using a baseband frequency-hopped channel simulation according to an embodiment of the invention. The various blocks depicted in FIG. 6 may be realized by any number of physical components or modules located throughout the system 600. A practical system 600 may include a number of other simulation blocks other than the ones shown in FIG. 6. Many conventional functions such as analog to digital conversion and filters other than that discussed below are omitted for clarity. Conventional subsystems, features, and aspects of system 600 will not be described in detail herein.

In this embodiment the system 600 generally includes a baseband processing module 602 with a baseband signal generator module 606 and a channel simulator module 604. The channel simulator module 604 includes a channel generator module 612, a reverse hopping module 614, a down sampler module 616, a signal filter module 618, and a hopping index computation module 620. The system 600 also includes an RF processing module 626 with an RF carrier elevation and hopping module 628. The system 600 communicates with a test device 634 via a downlink signal 630 and an uplink signal 632. In this regard, the system may also include a conversion-to-baseband module 636 configured to process uplink signals. The elements of system 600 may communicate using communication links 608, 613, 615, 617, 622, 624, and 632 which couple the various functional elements as explained below.

The baseband processing module 602 is configured to process a simulated baseband information signal to generate a filtered baseband information signal. In this example, the baseband processing module 602 includes the channel simulator module 604 and the baseband signal generator module 606, which may be realized as functional or logical elements of the baseband processing module 602. The baseband processing module 602 is suitably configured to carry out a number of operations using digital and/or analog processing at baseband frequencies. These baseband frequencies may be, for example, without limitation, 0 Hz-2 Mhz, which may be selected according to the communication protocols of the intended test device 634.

The baseband signal generator module 606 is coupled to the signal filter module 618 using the communication link 608 and is configured to generate a baseband information signal at a baseband data rate. This baseband data rate may be, for example, without limitation, 723.2 kilobits/second (BLUETOOTH™ DH5 packets), which may be selected according the data rate requirements of the communication protocols of the intended test device 634. Baseband signal generator module 606 produces a time domain signal that is coupled to signal filter module 618 through the communication link 608. The baseband signal generator module 606 may leverage a number of conventional baseband techniques and technologies to produce a suitable baseband signal. For example, a quantity of data to be transmitted will generally be broken into segments of proper size for transmission according to the simulated communication protocol. The segments may be interleaved in various ways such as convolutional or matrix interleaving. CRC codes may be added, as well as error correction coding. There are many other suitable channel formatting functions that may be added depending on the simulated communication protocol.

The channel simulator module 604, which is coupled to the baseband signal generator module 606, is configured to filter the baseband information signal using a simulated data signal from a down sampled channel profile to obtain a baseband output signal. In this example, signal filter module 618 is considered to be part of the channel simulator module 604, and signal filter module 618 performs the filtering as described in more detail below.

The channel generator module 612 is configured to generate a channel profile. The channel profile represents the level of attenuation at a given frequency within the channel frequency band, i.e., the frequency response of the channel. The channel profile simulates the properties of the transmission medium. For wireless transmission, the channel profile simulates air, rain, water vapor, buildings, interference, and other characteristics of the communication link. A transmission medium may have fixed or varying properties, so a channel profile may have a fixed or varying frequency attenuation over time, also known as fading. Examples of channel profiles are the Ricean, Rayleigh, or Gaussian fading models. In practice, the channel generator module 612 generates the channel profile using a sampling rate, for example, the same as the carrier signal data rate, according to the accuracy requirements of the simulation.

The output of channel generator module 612 is coupled to the input of the reverse hopping module 614 using the communication link 613. The reverse hopping module 614 is configured to shift the channel profile obtained by the channel generator by a frequency offset −f as explained above in context of FIG. 4, which may vary during a testing procedure. In this regard, the output of the reverse hopping module 614 is considered to be "pre-compensated". Here, the hopping frequency corresponds to a hopping index maintained by hopping index computation module 620.

The output of the reverse hopping module 614 is coupled to the input of the down sampler module 616 using the communication link 615. The down sampler module 616 is configured to reduce the data rate of the output of the reverse hopping module 614 (the same data rate that is generated at the channel generator module 612) to a data rate corresponding to the data rate of the simulated baseband information signal in preparation for filtering, since in this example embodiment the signal filter module 618 performs filtering at the baseband data rate.

The output of down sampler module 616 is coupled to the input of the signal filter module 618 using the communication link 617. As mentioned above, signal filter module 618 is coupled to the output of the baseband signal generator module 606 using the communication link 608. Signal filter module 618 is configured to filter the baseband information signal by the down sampled simulated channel profile to obtain a simulated baseband output signal. The signal filter module 618 performs channel filtering to attenuate the baseband signal from baseband signal generator module 606 according to the time domain channel signal received from down sampler module 616.

The filtered signal is output from signal filter module 618 to the RF processing module 626. In particular, the filtered signal is provided to the RF carrier elevation and hopping module 628 through communication link 610. If the signal filter module 618 is analog, communication link 610 may represent a simple wire. If the signal filter module 618 is digital, a digital-to-analog conversion may be performed or simulated between the signal filter module 618 and the RF carrier elevation and hopping module 628. Various analog filtering, amplification, and other functions may also be performed or simulated between the signal filter module 618 and the RF carrier elevation and hopping module 628.

The hopping index computation module 620 is coupled to the reverse hopping module 614 using the communication link 622 and to the RF carrier elevation and hopping module 628 using the communication link 624. Hopping index computation module 620 is configured to compute hopping indices corresponding to frequency offsets. In one embodiment, the hopping index computation module 620 calculates a number that indicates the frequency of the next hop. Generally, hopping frequencies are labeled by a number assigned to that particular frequency. For example, a hopping index for BLUETOOTH™ wireless technology might be a number between 1-79 to indicate each of 79 frequencies. In this embodiment, the hopping index is calculated by polynomial multiplication of a generator polynomial. The hopping index computation module 620 indicates hopping actions to be taken by both the reverse hopping module 614 and the RF carrier elevation and hopping module 628. However, the frequency offset for "shifting" the channel profile from channel generator module 612 is the opposite of the frequency offset used in the RF carrier elevation and hopping module 628 as explained above in context of FIG. 4.

The RF carrier elevation and hopping module 628 is coupled to hopping index computation module 620 using communication link 624. The RF carrier elevation and hopping module 628 is suitably configured to convert the received hopping index indicator to an RF offset frequency corresponding to the current frequency hop. The communication protocols of the device 634 to be tested determine a carrier frequency used in the simulation. The RF offset frequency is added to the carrier frequency to produce an up-conversion frequency. The signal from signal filter module 618 is elevated to the up-conversion frequency. In this manner, the RF processing module 626 is configured to elevate the filtered baseband information signal to construct a down link output signal 630 from the baseband output signal.

Notably, hopping index computation module 620 controls both reverse hopping module 614 and RF carrier elevation and hopping module 628. This control enables the system to perform frequency hopping in RF processing module 626 rather than in baseband processing module 602.

In practice, the RF carrier elevation and hopping module 628 may employ a voltage controlled oscillator to carry out the frequency hopping function. Generally, in practice, the signal from the signal filter module 618 is elevated by a mixer. Because hopping is performed by the RF carrier elevation plus hopping module 628, a baseband processing module can work with a bandwidth which depends on the generated signal bandwidth. For instance, for a GSM/GPRS/EGPRS signal, the sampling frequency assuming an over sampling factor of 8 is 270.833 kHz×8=2.1667 MHz, while the bandwidth on which the signals might hop can be up to 10 MHz. The RF processing module 626, in addition to the RF carrier elevation and hopping module 628, may contain RF amplifiers, filters, low noise mixers, and other functional elements that may also be utilized to obtain the down link test signal.

The downlink test signal 630 is generated by the RF processing module 626, and is received by the test device 634 using any suitable transport mechanism, such as a connection cable or a wireless communication scheme. In practice, the connection cable may be, without limitation, a low loss cable. The downlink test signal 630 is utilized to prompt a response from the test device 634.

The test device 634 may be, for example, a mobile phone. Other mobile devices may also be used as a test device 634 in system 600, for example, without limitation, a wireless laptop computer, a personal digital assistance (PDA), a smartphone, a walkie-talkie, and any device implementing a wireless transmission protocol. The test device 634 is configured to receive the downlink signal 630 and send an uplink signal 632 back to the baseband processing module 602 through the conversion to baseband module 636. The conversion to baseband module 636 and the uplink signal 632 represent a conventional reverse link suitable for the wireless transmission protocol. The test device 634 may be further configured to perform other operations. Such operations may include, without limitation: receive the simulated output test signal, detect the simulated output test signal, down-convert the simulated output test signal to the data rate of the simulated baseband information signal, and decode the simulated output signal to obtain the baseband information signal.

Figure 7:
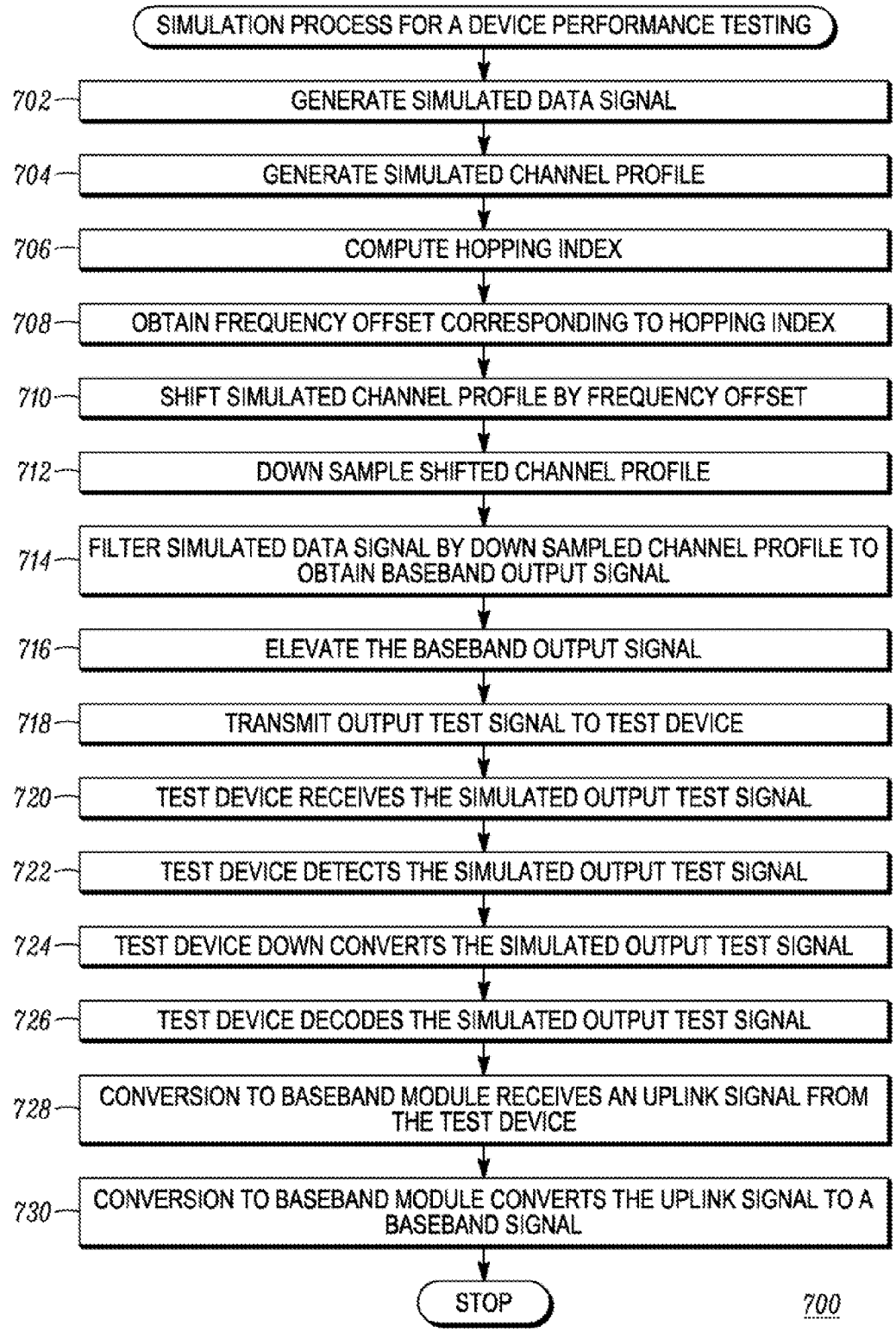
FIG. 7 is a flow chart of the low complexity frequency hopping solution for performance testing simulation process.

FIG. 7 is a flow chart that illustrates a simulation process 700 for device performance testing according to an embodiment of the invention. As will be described in detail below, the process 700 may be carried out to simulate a test signal for testing the test device 634 by generating a frequency hopping channel profile that is shifted (instead of shifting the signal) by an hopping frequency offset, decrease the sampling rate of the offset channel profile to a baseband signal data rate, filter the baseband signal by the offset channel profile, and up-convert the filtered baseband signal by an RF offset frequency plus the carrier frequency. The various tasks performed in connection with process 700 may be performed by software, hardware, firmware, or any combination thereof. For illustrative purposes, the following description of process 700 may refer to elements mentioned above in connection with FIG. 6. In practical embodiments, portions of process 700 may be performed by different elements of system 600, e.g., the baseband processing module 602, the baseband signal generator module 606, the channel simulator module 604, the RF carrier elevation and hopping module 628, or the test device 634 as described in detail below.

The simulation process 700 begins by generating a simulated data signal using the baseband signal generator 606 for transmission through a simulated channel profile (task 702). Process 700 may then generate the simulated channel profile (task 704) using the channel generator 612. The channel profile may be, without limitation, any of the channel profiles mentioned above in context of FIG. 1. For accurate channel simulation, the channel profile may be a fading profile with fixed or varying magnitude over time that models the fixed or varying magnitude over time of a channel in the real world. To obtain a hopping frequency offset for "shifting" the channel profile, process 700 then proceeds to compute a hopping index corresponding to a channel frequency (task 706) using the hopping index computational module 620 and obtaining a frequency offset corresponding to the hopping index (task 708).

Process 700 then shifts the simulated channel profile by the frequency offset to obtain a shifted channel profile (task 710) using the reverse hopping module 614. In this regard, the channel profile is generated with a bandwidth required for frequency hopping, and the hopping is simulated by shifting the channel instead of the signal. To reduce the number of computational operations for frequency hopping simulation, process 700 decreases the sampling rate of the shifted channel profile to obtain a simulated down sampled channel profile at the data rate of the simulated baseband signal (task 712) using the down sampler module 616.

Process 700 then filters the simulated data signal by the down sampled channel profile to obtain a baseband output signal (task 714) using signal filter module 618. The signal filter module 618 performs channel filtering to attenuate the baseband signal from baseband signal generator module 606 according to the time domain channel signal received from down sampler module 616 as explained in context of FIG. 6 above. Next, to simulate transmitting of the output signal through the frequency hopped communication channel, process 700 then constructs a downlink output signal by elevating the baseband output signal to a frequency that is equal to the sum of the inverse of the frequency offset and a channel carrier frequency to obtain simulated output test signal (task 716) using RF carrier elevation plus hopping module 628.

Process 700 then proceeds to transmit the simulated output test signal to the test device (task 718) using the downlink channel 630. Test device 634 may then receive the output test signal to perform testing of the device 634 with the simulated output test signal (task 720) as explained in the context of FIG. 6 above. After receiving the output test signal (task 720) the test device 634 may detect the simulated output test signal (task 722) using a suitable detection algorithm, down converting the simulated output test signal to the data rate of the simulated baseband information signal (task 724) using a suitable mathematical operation, and decoding the simulated output test signal (after the down conversion) to obtain the baseband information signal (task 726) using a decoding algorithm compatible with encoder of the communication protocol used to test the performance of the test device 634. The conversion to baseband module 636 then receives the uplink signal 632 from the test device 634 (task 728) and proceeds to convert the uplink signal 632 to the baseband signal (task 730).

The preceding detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques and components related to signal processing, filters, wireless communications, wireless channel simulation, radio frequency (RF) technology and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The detailed description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown in the figures depict example arrangements of elements, additional intervening elements, devices, features, or components may be present in an embodiment of the invention (assuming that the functionality of the system is not adversely affected).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for simulation of a frequency hopping radio system, the method comprising:
   generating a pre-compensated simulated channel profile at a sampling rate corresponding to a data rate of a simulated baseband information signal, the pre-compensated simulated channel profile having a center frequency that is offset from a center frequency of the simulated baseband information signal by a frequency offset;
   filtering the simulated baseband information signal by the pre-compensated simulated channel profile to obtain a simulated baseband output signal;
   elevating the simulated baseband output signal to an elevated frequency to obtain a simulated output test signal, wherein the elevated frequency is equal to a carrier frequency plus an inverse of the frequency offset; and transmitting the simulated output test signal.

2. A method according to claim 1, wherein generating the pre-compensated simulated channel profile further comprises:

generating a simulated channel profile;

shifting the simulated channel profile by the frequency offset to obtain a shifted channel profile; and decreasing a sampling rate of the shifted channel profile to obtain the pre-compensated simulated channel profile.

3. A method according to claim 2, wherein shifting the simulated channel profile further comprises:

computing a hopping index corresponding to a channel frequency; and obtaining the frequency offset corresponding to the hopping index.

4. A method according to claim 3, further comprising setting the frequency hopping pattern by the hopping index.

5. A method according to claim 2, further comprising varying the frequency offset over time according to a frequency hopping pattern.

6. A method according to claim 1, further comprising testing a test device with the simulated output test signal.

7. A method according to claim 6, further comprising:

receiving the simulated output test signal;

detecting the simulated output test signal;

down converting the simulated output test signal to the data rate of the simulated baseband information signal; and decoding the simulated output signal to obtain the baseband information signal.

8. A test system for simulation of a frequency hopping radio system, the test system comprising:

a baseband signal generator configured to generate a baseband information signal at a baseband data rate and centered at a baseband frequency; and a channel simulator coupled to the baseband signal generator and configured to filter the baseband information signal by a down sampled channel profile to obtain a filtered baseband information signal, the channel simulator comprising:

a reverse hopping module configured to shift a channel profile by a hopping frequency corresponding to a hopping index to obtain a shifted channel profile having a center frequency offset from the baseband frequency by the hopping frequency; and a down sampler coupled to the reverse frequency hopping module and configured to decrease a sampling rate of the shifted channel profile to the baseband data rate to obtain the down sampled channel profile.

9. A system according to claim 8, wherein the channel simulator further comprises a filter coupled to the baseband signal generator and to the down sampler, the filter being configured to filter the baseband information signal by the down sampled channel profile.

10. A system according to claim 8, further comprising a channel generator coupled to the reverse frequency hopping module, the channel generator being configured to generate the channel profile corresponding to a plurality of channel signals.

11. A system according to claim 8, further comprising a baseband processor configured to process the baseband information signal to generate the filtered baseband information signal, wherein the baseband processor includes the baseband signal generator and the channel simulator.

12. A system according to claim 11, further comprising a RF processing module coupled to the baseband processor and configured to elevate the filtered baseband information signal to a channel frequency to obtain a down link test signal.

* * * * *